Figure 1:
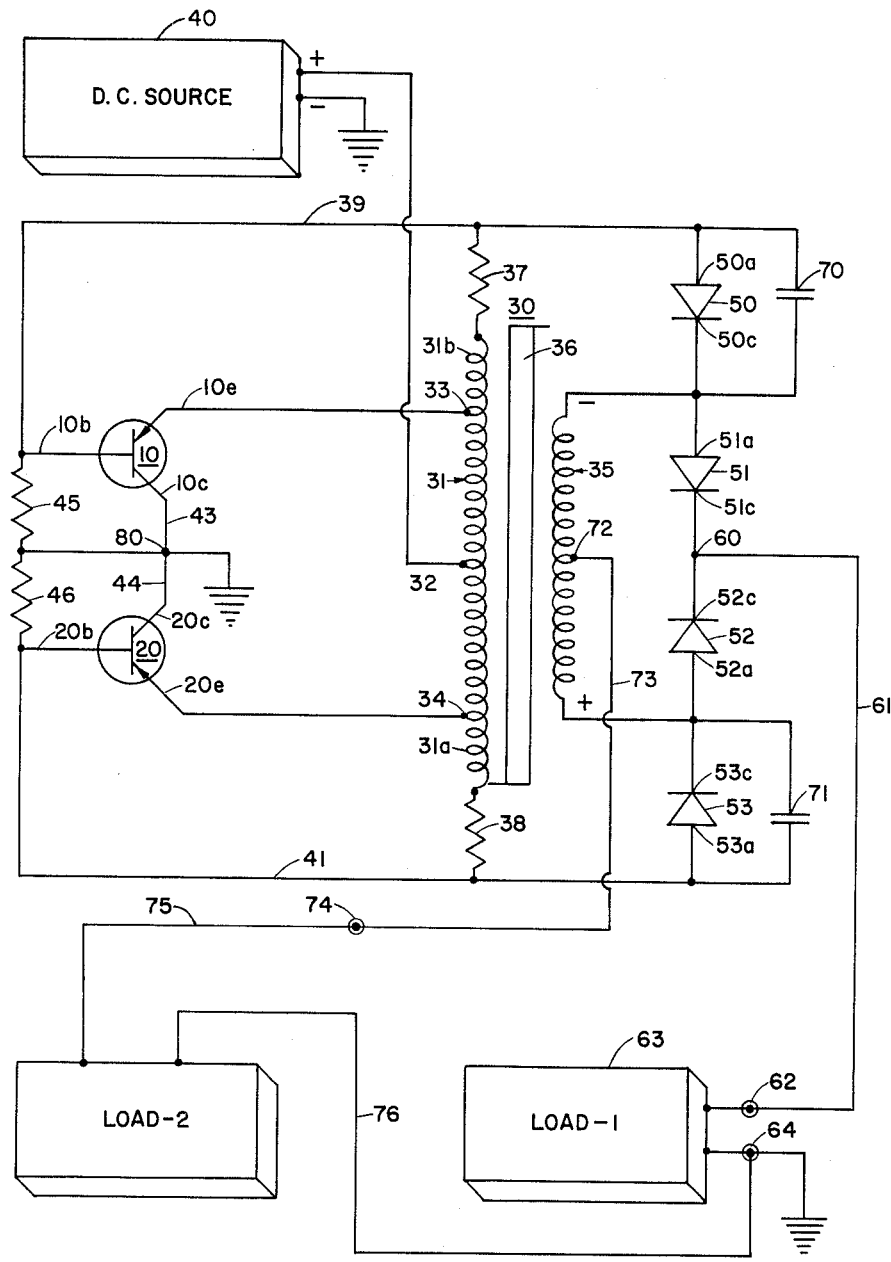

Oct. 19, 1965   E. J. KING, JR   3,213,346
TRANSISTOR POWER SUPPLY
Filed Nov. 23, 1962   2 Sheets-Sheet 1

INVENTOR.
EDWARD J. KING, JR.
BY
ATTORNEY

United States Patent Office 3,213,346
Patented Oct. 19, 1965

3,213,346
TRANSISTOR POWER SUPPLY
Edward J. King, Jr., Leawood, Kans., assignor to King Radio Corporation, Olathe, Kans., a corporation of Kansas
Filed Nov. 23, 1962, Ser. No. 239,847
5 Claims. (Cl. 321—2)

This invention relates in general to a low voltage D.C. to a high voltage D.C. converter, and in particular to a D.C. converter which has improved voltage output regulation.

The high power transistorized oscillator has proved to be a nearly ideal device for converting low voltage D.C. to high voltage A.C. or if rectified, to high voltage D.C. The use and theory of operation of the D.C. transistor converter is clearly explained in an article by T. R. Pye, entitled "High-Power Transistor D.C. Converters" published in Electronics and Radio Engineer, March 1959, beginning on page 96. The voltage output of these supplies, however, is not constant with a variation in load, but steadily decreases as the load current increases. Further, the efficiency of the converter suffers because of the large power losses in the feedback resistors and bias resistors required for proper operation. Since the base current of the transistors is substantially constant regardless of the collector to emitter current, the losses in the base current circuit will reduce the efficiency for small load currents.

The bias resistors in the grounded collector circuit, for example, must also be large enough to cause the transistor to have its proper current between the emitter and base. Any power loss in this resistor will also reduce the overall efficiency of this converter for low power outputs.

If the converter is to be used with a fairly constant load current, the circuit components including the bias resistor and the feedback network can be selected for the peak performance for both efficiency and voltage output.

In an aircraft electronics system, however, one or more receivers or transmitters, or other electronic circuitry may be turned on, either singly, in combination, or simultaneously. The output current requirements for the common power supply will, as a consequence, vary from no-load to full-load and nearly all intermediate loads between no-load and full-load. The usual bias methods would consume unnecessary power at no-load in order to supply sufficient bias at full-load. A compromise bias current adjustment may cause the output voltage to fall below the tolerance limits for satisfactory operation when the converter is under its heaviest load conditions. Insufficient bias will cause damage to the transistors.

It is, therefore, an object of this invention to improve the overall efficiency of the D.C. to D.C. transistor converter.

It is a further object of this invention to improve the voltage regulation of the transistor converter.

It was discovered in accordance with this invention that when the bias of the transistors is increased in direct ratio to the increase in load current, that a slightly better voltage regulation was obtained.

It was also discovered that when the base bias of the transistor was thus varied that a much smaller fixed bias and feedback currents is needed to be supplied by the network resistors. A reduction in these resistor currents results in an increase in the overall efficiency of the converter at low power outputs.

This invention features a high powered transistorized converter of the grounded emitter type where the frequency of oscillation is determined by the saturable core transformer. Feedback is obtained from windings on the transformer and applied between the emitter and base of the transistors. A starting and biasing current is provided by resistively connecting the base of the transistors to their respective collectors. Correct bias current to the transistors is accomplished by connecting the output bridge rectifiers to the base of the transistors rather than directly to the load ground. Thus, connected, the output load current must flow through the base-emitter junction. The bias on the transistors will then be determined, for the most part, by the output load current rather than by the current applied by the bias resistors.

Figure 2:
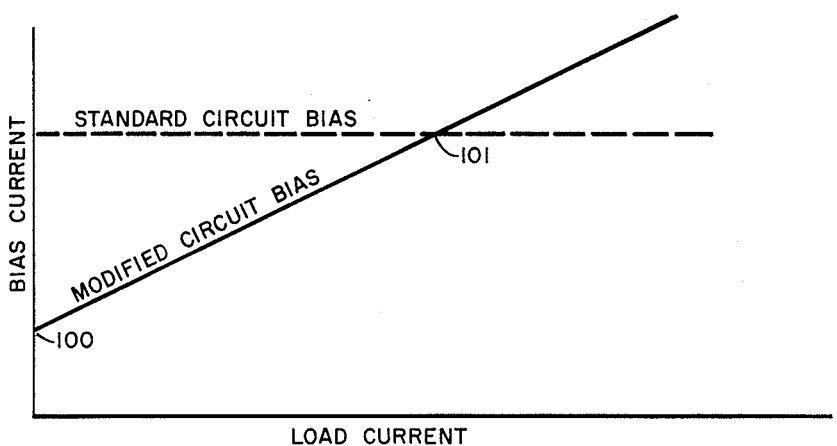
Figure 3:
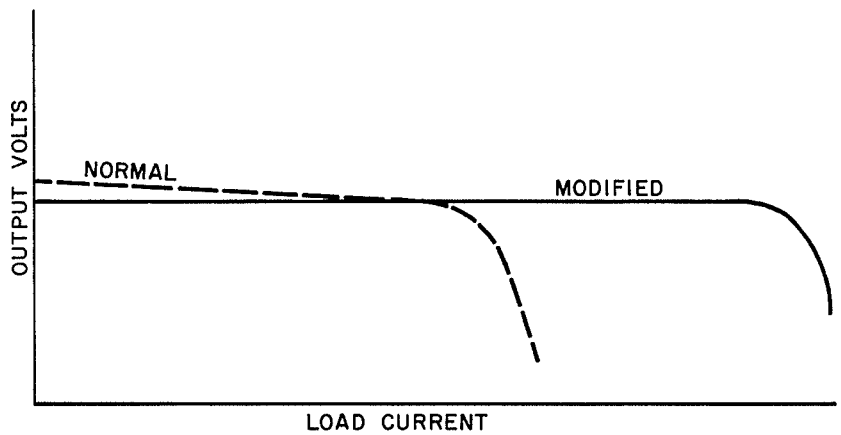

Other objects, features and advantages of the invention will become apparent from the following description and claims when read in view of the accompanying drawings, in which:

FIGURE 1 shows a low voltage direct current to a high voltage direct current transistorized converter incorporating the preferred features of this invention; and FIGURE 2 is a graph of bias current versus load for a standard and the modified transistor power supplied; and FIGURE 3 is a graph of the output volts versus load of a standard and the modified power supply.

Referring to the figures in general but particularly to FIGURE 1, the novel inverter circuit comprises an oscillator which includes generally a pair of transistors 10 and 20, a transformer generally referred to as 30 and a D.C. source generally referred to as 40. Transistor 10 comprises an emitter 10e, a collector 10c and a base 10b. Transistor 20, likewise, includes an emitter 20e, a collector 20c and a base 20b. Transformer 30 has a primary winding 31 which has a center tap 32 and a pair of taps 33 and 34 intermediate the center tap and the end of primary winding 31. Transformer 30 also contains a secondary 35 and a core 36 which is of the saturable reactor type and described in the afore-mentioned article by Pye. Feedback resistors 37 and 38 are connected to the ends of the primary winding 31 and to the bases 10b and 20b through wires 39 and 41, respectively. Emitter 20e is electrically connected to tap 34 and emitter 10e is electrically connected to tap 33. Collectors 10c and 20c are connected through wires 43 and 44, respectively, to ground. A pair of resistors 45 and 46 provide base bias for transistors 10 and 20 and also provide a method of supplying starting bias for the transistor oscillator.

The A.C. output voltage which appears across the output or secondary winding 35 is applied to a bridge rectifier which comprises diodes 50, 51, 52 and 53. Diodes 51 and 52 have their anodes 51a and 52a connected to the ends of the secondary windings 35. Their cathodes 51c and 52c are connected together at junction 60 and connected through a wire 61 to terminal 62. A load 63 is connected between terminal 62 and ground through a second output terminal 64. Diodes 50 and 53 have their cathodes 50c and 53c connected to the anodes 51a and 52a of diodes 51 and 52, respectively. The anodes 50a and 53a, rather than being connected to terminal 64 as is normally the case for a bridge circuit, are connected to the base 10b and 20b of transistors 10 and 20, respectively. Diodes 50 and 53 are by-passed by capacitors 70 and 71, respectively. A lower voltage than that appearing between anodes 51a and 52a may be provided by tapping secondary 35 at a point, for example, 72. The lower output voltage then may be applied through a wire 73 to a second output terminal 74. Load 2 is then connected through a wire 73 to terminal 74 and through wire 76 to the ground terminal 64.

Operation

The operation of the oscillator circuit is well known to those skilled in the art and will only be briefly described. For a more detailed description of the circuit, reference may be made to the article by Pye previously referenced.

Referring to FIGURE 1, transistors 10 and 20 are mounted so that the collectors may be grounded to the same heat sink. This provides for ease of construction and facilitates removal of heat from the transistor. The transistors which are connected to the primary 31 at taps 33 and 34 alternately switch the polarity of D.C. source 40 across the primary 31 of transformer 30. Since core 36 of transformer 30 is of the saturable type, a square-wave voltage will appear across secondary 35. Feedback windings 31b and 31a apply a feedback voltage between the emitter 10e and 10b of transistor 10, 20e and 20b of transistor 20. The voltage thus fed back to the transistor circuit will cause the transistor and transformer to oscillate at a frequency which is primarily determined by the characteristics of transformer 30. Each transistor will alternately saturate the core while the other transistor resets the core. Resistors 37 and 38 are selected to provide sufficient feedback voltage to the transistors 10 and 20 in order that the oscillation of the power supply will be sustained. Resistors 45 and 46 are selected in order to apply ample bias between the base 10b and emitter 10e of transistor 10. The square-wave voltage appearing across secondary 35 is applied to the transistor bridge consisting of diodes 50, 51, 52 and 53. The bridge operates in a usual manner with the D.C. voltage being taken from junction 60 and ground.

Referring to FIGURE 3, the broken line indicates the drop in output voltage with an increase in output load current for a standard power supply while the solid line indicates the improved characteristics of the modified power supply. The reduced bias (see FIGURE 2) also causes a slight reduction in voltage at no-load thereby improving the regulation of the system to a certain extent. As the power output demand increases, the voltage output between terminals 60 and 64 will drop. In order to substantially eliminate the drastic drop in voltage at output terminals 62 and 64, a novel reconnection of the grounding circuit of diodes 50 and 53 was effected. The novel modification consists in connecting the anode 50a of diode 50 to the base 10b of transistor 19, and connecting the anode 53a of diode 53 to base 20b of transistor 20. Since feedback is now being applied from the output circuit directly back to the transistor base, resistor 38 can be much large than without the feedback circuit. For example, resistor 38 was increased from 6.8 ohms to 18 ohms in the modified circuit shown in FIGURE 1. The increase in resistance of resistor 37 or 38 decreases the feedback current for small power output requirements, therefore, greatly increasing the efficiency of the circuit.

In order to analyze the operation of this circuit with diodes 50 and 53 connected as shown in FIGURE 1, let it be assumed that transistor 10 is biased into conduction and transistor 20 is reverse biased and therefore nonconducting. With positive voltage applied to point 32, point 33 is near ground potential due to current in transistor 10. Since point 33 is negative with respect to point 32, transformer action will cause secondary 35 to have for the particular instant the polarity indicated. Thus, with a positive voltage being applied to anode 52a, current will flow from anode 52a to cathode 52c of diode 52. Sinc diode 51 is poled in the reverse direction, the current will flow through wire 61, through load 63 and through terminal 64 to ground. From ground it will flow to junction 80. Since it was assumed that transistor 10 was switched to conduction, the emitter 10e will be at essentially ground potential. The current will flow through the D.C. source, through point 32 to point 33 of the transformer primary through the emitter-base junction of the transistor 10 (this producing the bias current) and through wire 39 to diode 50. The current will pass through diode 50 to the negative side of the voltage source, winding 35 completing the circuit. Thus, as the load current increases, the base to emitter current and hence the bias of the transistor increases causing transistor 20 to be driven more toward saturation with each incremental increase in load current. As transistor 20 is driven toward saturation with an increase in load current, the operation of the oscillator circuit will be improved and stabilized, resulting in better performance for higher load currents.

A second load may be connected to tap 72 which is normally a center tap for secondary winding 35. A direct current voltage will appear, by a reduced amount, across terminals 74 and 64. Since current flowing through load 2 also passes through the base to emitter junction of the transistors, it will have the same effect upon the operation of the D.C. converter.

FIGURE 2 compares graphically the transistor bias current of the standard circuit (show by dotted lines) with the bias current of the modified circuit in accordance with FIGURE 1 (solid line). The bias of the standard circuit is determined by the maximum normal operating loads, and established at this point by the value of resistors 45 or 46 to provide the large current needed for maximum load conditions. Since load currents will not affect the base to emitter current, the bias will remain substantially constant with wide variation in load current.

The modified circuit, on the other hand, will have the bias initially set by resistors 45 and 46 to point 100 for no-load current. The value of the bias current is reduced to an amount needed to operate the converter under no-load conditions. As the load current increases, the bias current will correspondingly increase thereby preventing damage to the transistors from the increased load. Since the circuit will increase the bias current even beyond the normal operating load at 101 the circuit is capable of increased loads beyond the limit of the fixed bias circuit (see FIGURE 3).

Again, referring to FIGURE 3, the dotted line shows the output voltage with a variation in current through load 1 (for example). While the circuit is not designed to maintain a voltage within certain tolerances, thus, the circuit, once the output voltage is set will maintain this output voltage through a wide variation of currents.

Transistors 10 and 20 have been described using the PNP-type transistor. It is obvious, of course, that other types of transistors may be used, for example, NPN-type transistors. Further, either silicon or germanium transistors can be employed in the circuit and one skilled in the art would so employ these circuits by adjusting the bias networks and feedback network for proper operation. Thus, a circuit has been described which provides for an increase in efficiency of a D.C. to D.C. converter for low level current operation, and further, a circuit has been described that will maintain a relatively constant voltage output with a wide variation in load power requirements. A circuit has further been disclosed that requires few additional parts over the conventional D.C. to D.C. converter and yet provides a much more stable voltage output with wide variations in load current.

Although this invention has been described with respect to particular embodiments thereof, it is not to be so limited, as changes and modifications may be made therein which are within the spirit and scope of the invention as defined by the appended claims.

I claim:

1. An improved transistorized power supply comprising:

(a) a saturable core transformer having a center tapped input and a tapped output winding;

(b) each side of said center tapped input winding having a second tap between its end and the center tap;

(c) a pair of transistors each having a collector, emitter and a base;

(d) each of said emitters connected to a second tap;
(e) a first resistance means connected between each of the ends of said input winding and said corresponding bases;
(f) a second resistive means connected between each of said bases and ground;
(g) each of said collectors connected to ground;
(h) a direct current source having a positive and negative terminal, said positive terminal connected to said center tap on said input winding and said negative terminal connected to ground;
(i) a first and second diode having their anodes connected to the ends respectively of said output winding and their cathodes connected together;
(j) a load connected between said cathodes and ground;
(k) a second set of diodes connected respectively between the ends of said output winding and the corresponding base of said transistors and poled to conduct current from said base to said load;

whereby an increase in load current will result in an increase in current through said second resistive means increasing said base to emitter current increasing the efficiency of said transistors and reducing the voltage drop at said load.

2. A device as described in claim 1 wherein said secondary includes a tap, a second output terminal and means connecting said second output terminal to said tape, whereby an increase in load at either said first set of output terminals or said second set of output terminals will cause an increase in current through said bias means and a resulting increase in the output voltage from said output winding.

3. A direct current-to-direct current converter comprising:
(1) a first and second transistor, each having a base, a collector and an emitter;
(2) biasing means connected between the bases and collector of each transistor;
(3) a transformer having a saturable core and primary and a secondary thereon, said primary having a center tap and a second tap on each side of said center tap to provide a feedback winding between said second taps and the end of said primary winding;
(4) means connecting one of said feedback windings between the base and emitter of said first transistor;
(5) means connecting the remaining feedback winding between the emitter and base of said second transistor;
(6) a direct current source having a positive and negative terminal, said positive terminal connected to said center tap and said negative terminal connected to said collectors;
(7) first and second diodes connected in series opposition across said output winding, said diodes having their cathodes joined, said cathodes connected to said output terminal;
(8) a second pair of diodes having an anode and a cathode, said cathode of each of said diodes connected respectively to the ends of said output windings, and the anodes of said diodes connected respectively to each base of said first and second transistor;

whereby a large current flowing through a load connected to said output terminal flows through said second diode and through said biasing resistor increasing the bias on said transistors thereby reducing the voltage loss across said load.

4. A device as described in claim 3 wherein said secondary includes a tap, a second output terminal and means connecting said second output terminal to said tap, whereby an increase in load at either said first set of output terminals or said second set of output terminals will cause an increase in current through said bias means and a resulting increase in the output voltage from said output winding.

5. In a direct current converter having: a first and second transistor, each having a base, a collector and an emitter; biasing means connected between the bases and collector of each transistor; a transformer having a saturable core and primary and a secondary thereon, said primary having a center tap and second tap on each side of said center tap to provide a feedback winding between said second taps and the end of said primary winding; means connecting one of said feedback windings between the base and emitter of said first transistor; means connecting the remaining feedback winding between the emitter and base of said second transistor; a direct current source having a positive and negative terminal, said positive terminal connected to said center tap and said negative terminal connected to said collectors; first and second diodes connected in series opposition across said output winding, said diodes having their cathodes joined, said cathodes connected to said output terminal; and a second pair of diodes each having a cathode connected to the anode of said first pair of diodes, and an anode connected to an output terminal, an improvement comprising: (a) means for connecting the anodes of said second pair of diodes to the base of said first and second transistors respectively; and (b) means for biasing said transistors to predetermined operating point under no-load conditions.

References Cited by the Examiner

UNITED STATES PATENTS

| 2,321,357 | 6/43 | Boucher | 307—36 |
| 2,948,841 | 8/60 | Locanthi et al. | 331—113.1 |
| 3,004,226 | 10/61 | Jensen | 331—113.1 |

FOREIGN PATENTS 222,762   1/62   Austria.

LLOYD McCOLLUM, *Primary Examiner.*